United States Patent
Brewinski et al.

(10) Patent No.: US 11,120,016 B2
(45) Date of Patent: Sep. 14, 2021

(54) AUTOMATED GENERATION OF A QUERY STATEMENT BASED ON USER SELECTIONS RECEIVED THROUGH A USER INTERFACE

(71) Applicant: INTERNATIONAL BUSINESS MACHINES CORPORATION, Armonk, NY (US)

(72) Inventors: Bartosz Brewinski, Mississauga (CA); Christopher Gold, Dallas, TX (US); Qiang Ren, Hartland, WI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 204 days.

(21) Appl. No.: 15/850,459

(22) Filed: Dec. 21, 2017

(65) Prior Publication Data
US 2019/0197153 A1 Jun. 27, 2019

(51) Int. Cl.
*G06F 16/248* (2019.01)
*G06F 3/0482* (2013.01)
(Continued)

(52) U.S. Cl.
CPC ........ *G06F 16/2428* (2019.01); *G06F 16/248* (2019.01); *G06F 16/2456* (2019.01);
(Continued)

(58) Field of Classification Search
CPC .............. G06F 16/2428; G06F 16/248; G06F 16/2456; G06F 40/177; G06F 3/0482; G06F 3/0483
See application file for complete search history.

(56) References Cited

U.S. PATENT DOCUMENTS 6,640,221 B1 * 10/2003 Levine ................ G06F 16/2423
6,678,691 B1    1/2004 Kikkers
(Continued)

OTHER PUBLICATIONS

Greene et all, Chapter 13: Web-based Tools—Open SkyQuery: Distributed Database Queries and Crossmatching, The National Virtual Observatory Book ASP Conference Series, vol. 382, © 2008 M. J. Graham, M. J. Fitzpatrick, and T. A. McGlynn, eds., pp. 111-118 (Year: 2008).*

(Continued)

*Primary Examiner* — Cheyne D Ly
(74) *Attorney, Agent, or Firm* — Michael Best & Friedrich LLP (57) ABSTRACT

Provide a system for automatically building a query statement for a database. The system includes an electronic processor. The electronic processor is configured to provide a user interface displayed by a display device and including a plurality of tabs. The electronic processor is also configured to provide a first list of a plurality of data fields included in the database. The electronic processor is configured to receive, via the user interface, a first selection of one of the plurality of data fields from the first list and a second selection of a criterion for one of the plurality of data fields from the first list. The electronic processor is configured to automatically build the query statement for the database. The electronic processor is further configured to execute the query statement on the database and output results of executing the query statement.

12 Claims, 11 Drawing Sheets

(51) Int. Cl.
    *G06F 3/0483* (2013.01)
    *G06F 16/242* (2019.01)
    *G06F 16/2455* (2019.01)
    *G06F 40/177* (2020.01)
(52) U.S. Cl.
    CPC .......... *G06F 3/0482* (2013.01); *G06F 3/0483* (2013.01); *G06F 40/177* (2020.01)

(56) References Cited

U.S. PATENT DOCUMENTS

| | | | |
|---|---|---|---|
| 6,748,402 B1 | 6/2004 | Reeves et al. | |
| 10,013,466 B2 | 7/2018 | Zimmerer | |
| 10,109,027 B1 | 10/2018 | Stack | |
| 2003/0018644 A1* | 1/2003 | Bala | G06F 17/246 |
| 2005/0160091 A1* | 7/2005 | Daniel | G06F 16/90335 |
| 2007/0168228 A1 | 7/2007 | Lawless | |
| 2007/0208721 A1* | 9/2007 | Zaman | G06F 16/283 |
| 2009/0094217 A1* | 4/2009 | Dettinger | G06F 16/2423 |
| 2011/0196864 A1* | 8/2011 | Mason | G06F 3/0416 707/728 |
| 2013/0007646 A1* | 1/2013 | Tranter | G06F 16/2428 715/769 |
| 2013/0110764 A1 | 5/2013 | Wilf | |
| 2015/0134677 A1* | 5/2015 | Abuelsaad | G06F 16/242 707/756 |

OTHER PUBLICATIONS

Kumaresan et al, Development of a GIS-based Traffic Safety Analysis System, 2009 Annual ESRI International User Conference San Diego, California Jul. 13-17, 2009, pp. 1-12 (Year: 2009).*
Non-Final Office Action from the U.S. Appl. No. 15/850,434 dated Jan. 24, 2020 (6 pages).
United States Patent Office Action for U.S. Appl. No. 15/850,434 dated Jul. 10, 2020 (5 pages).
United States Patent Office Notice of Allowance for U.S. Appl. No. 15/850,434 dated Sep. 14, 2020 (8 pages).

* cited by examiner

| MappingKey | AliasTableName | XmlElementName | xPath | IsKey |
|---|---|---|---|---|
| 1 | ImplantHistory | DeviceName | /study/patient/procedureHistory/implants/device/@name | 1 |
| 2 | ImplantHistory | DeviceModel | /study/patient/procedureHistory/implants/device/@model | 0 |

| Patient Name | Height (in) | Weight (lbs) | Gender | Race |
|---|---|---|---|---|
| Patient 1 | 80.00 | 132.28 | Male | White |
| Patient 2 | 61 | 120 | Male | Unspecified |
| Patient 3 | 55.84 | 158.42 | Male | White |
| Patient 4 | 70.08 | 165.19 | Male | Other |
| Patient 5 | 62.99 | 110.23 | Male | Other |
| Patient 6 | | | Female | White |
| Patient 7 | | | Female | Other |
| Patient 8 | | | Female | Other |
| Patient 9 | 80.63 | 130.19 | Female | Other |
| Patient 10 | | 160.06 | Female | Other |
| Patient 11 | | | Male | Asian |

```
DECLARE @param0 AS Int = 1
DECLARE @param1 AS NVARCHAR(500) = '18'
DECLARE @param2 AS NVARCHAR(500) = '25'
DECLARE @param3 AS NVARCHAR(500) = 'Female'
DECLARE @param4 AS NVARCHAR(500) = 'Male'

SELECT [ReportStatusView].[PatientName],[Patient Name],[ReportStatusView].[PatientKey],[PatientDataView].[PatientKey],[PatientDataView].[Age],[PatientDataView].[Gender],[Gender],[PatientDataView].[Race],[Race]

FROM [Query].[ReportStatusView]
LEFT OUTER JOIN [Query].[PatientDataView] WITH (NOLOCK) ON [Query].[ReportStatusView].SourceKey = [Query].[PatientDataView].SourceKey WHERE [Query].[ReportStatusView].PatientKey = [Query].[PatientDataView].PatientKey AND [Query].[ReportStatusView].ReportTypeKey IN (2 , 3) AND [Query].[PatientDataView].[Age] >= '18' AND [Query].[PatientDataView].[Age] <= '25' AND [Query].[PatientDataView].[Gender] IN ('Female','Male') AND [ReportStatusView].[PatientName],[Patient Name],[ReportStatusView].[PatientKey],[PatientDataView].[PatientKey],[PatientDataView].[Age],[PatientDataView].[Gender],[Gender],[PatientDataView].[Race],[Race]
FROM [Query].[ReportStatusView]
LEFT OUTER JOIN [Query].[PatientDataView] WITH (NOLOCK) ON [Query].[ReportStatusView].SourceKey = [Query].[PatientDataView].SourceKey WHERE [Query].[ReportStatusView].PatientKey > 0 AND [Query].[PatientDataView].[ReportTypeKey] IN (3) AND [Query].[PatientDataView].[Age] >= '18' AND [Query].[PatientDataView].[Age] <= '25' UNION SELECT [ReportStatusView].[PatientName],[Patient Name],[ReportStatusView].[PatientKey],[PatientDataView].[PatientKey],[PatientDataView].[Age],[PatientDataView].[Gender],[Gender],[PatientDataView].[Race],[Race]
FROM [Query].[ReportStatusView]
LEFT OUTER JOIN [Query].[PatientDataView] WITH (NOLOCK) ON [Query].[ReportStatusView].SourceKey = [Query].[PatientDataView].SourceKey WHERE [Query].[ReportStatusView].PatientKey > 0 AND [Query].[PatientDataView].[ReportTypeKey] = 4 AND [Query].[PatientDataView].[Age] >= '18' AND [Query].[PatientDataView].[Age] <= '25' AND [Query].[PatientDataView].[Gender] IN ('Female','Male') AND [ReportStatusView].[PatientName],[Patient Name],[ReportStatusView].[PatientKey],[PatientDataView].[PatientKey],[PatientDataView].[Age],[PatientDataView].[Gender],[Gender],[PatientDataView].[Race],[Race]
FROM [Query].[ReportStatusView]
LEFT OUTER JOIN [Query].[PatientDataView] WITH (NOLOCK) ON [Query].[ReportStatusView].SourceKey = [Query].[PatientDataView].SourceKey WHERE [Query].[ReportStatusView].PatientKey > 0 AND [Query].[PatientDataView].[ReportTypeKey] = 5 AND [Query].[PatientDataView].[Age] >= '18' AND [Query].[PatientDataView].[Age] <= '25' AND [Query].[PatientDataView].[Gender] IN ('Female','Male') AND [ReportStatusView].[PatientName],[Patient Name],[ReportStatusView].[PatientKey],[PatientDataView].[PatientKey],tmp0.[Age] AS [Age],tmp0.[Gender] AS [Gender], tmp0.[Race] AS [Race]
FROM [Query].[ReportStatusView]
LEFT OUTER JOIN [Query].[PatientDataView] tmp0 WITH (NOLOCK) ON tmp0.PatientKey = [Query].[ReportStatusView].PatientKey AND tmp0.StudyKey = [Query].[ReportStatusView].StudyKey AND tmp0.[ReportTypeKey] IN (@param0)

WHERE tmp0.[Age] >= @param1 AND tmp0.[Age] <= @param2 AND tmp0.[Gender] IN (@param3, @param4) AND [Query].[ReportStatusView].ReportTypeKey = 1
```

AUTOMATED GENERATION OF A QUERY STATEMENT BASED ON USER SELECTIONS RECEIVED THROUGH A USER INTERFACE

FIELD

Embodiments described herein relate to generating a combined database that includes data extracted from multiple systems. Embodiments described herein also relate to a user interface for building a query for a database, such as a combined database.

SUMMARY

Data, such as medical data, is often stored in a plurality of databases or systems. Examples of these systems include a hemodynamic system and a cardio reporting system. To access data from each of these systems a user has to generate a query for each system. Generating a query for each system takes time and effort on the part of the user. Also, as each system returns the results of the query separately from other systems, it is difficult for the user to gain insight from the returned results. Therefore, there is a need for a method for combining separate systems into a single combined database that the user can query using a user interface. Additionally, there is a need for a user interface that allows a user, including a user without programming experience or skills, to build a query statement for a database, such as a combined database.

Accordingly, embodiments described herein provide a system for automatically building a query statement for a database. The system includes an electronic processor. The electronic processor is configured to provide a user interface displayed by a display device, the user interface including a plurality of tabs. The plurality of tabs represent types of data fields included in the database. The electronic processor is also configured to provide, within the user interface, a first list of a plurality of data fields included in the database. The electronic processor is configured to receive, via the user interface, a first selection of one of the plurality of data fields from the first list and a second selection of a criterion for one of the plurality of data fields from the first list. The electronic processor is configured to automatically build the query statement for the database. The query statement joins a plurality of tables included in the database based on the first selection and second selection and selects data elements from the plurality of joined tables based on the first selection where the data elements satisfy the second selection. The electronic processor is further configured to execute the query statement on the database and output results of executing the query statement for display within the user interface.

Embodiments described herein also provide a method of automatically building a query statement for a database. The method includes providing a user interface displayed by a display device. The user interface includes a plurality of tabs and the tabs represent types of data fields included in the database. The method also includes providing, within the user interface, a first list of a plurality of data fields included in the database, receiving, via the user interface, a first selection of one of the plurality of data fields from the first list, and receiving, via the user interface, a second selection of a criterion for one of the plurality of data fields. The method further includes automatically building, with an electronic processor, the query statement for the database. The query statement joins a plurality of tables included in the database based on the first selection and second selection and selects data elements from the plurality of joined tables based on the first selection where the data elements satisfy the second selection. The method includes executing the query statement on the database and outputting results of executing the query statement for display within the user interface.

BRIEF DESCRIPTION OF THE DRAWINGS

FIG. 11 is a query statement automatically generated based on the selections of FIG. 10.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

The methods and functionality described herein for building a query for a database, such as a combined database, and for generating a combined database include an electronic device (a user device) accessing services through one or more servers (including servers accessible through one or more cloud services environments). However, it should be understood that the methods described herein may be used in other computer systems and configurations. For example, the methods described herein (or portions thereof) may be performed locally at an electronic device (a user device) without communicating with any remote servers or services. Accordingly, the methods and systems described in the present application are provided as one example and should not be considered limiting.

Figure 1:
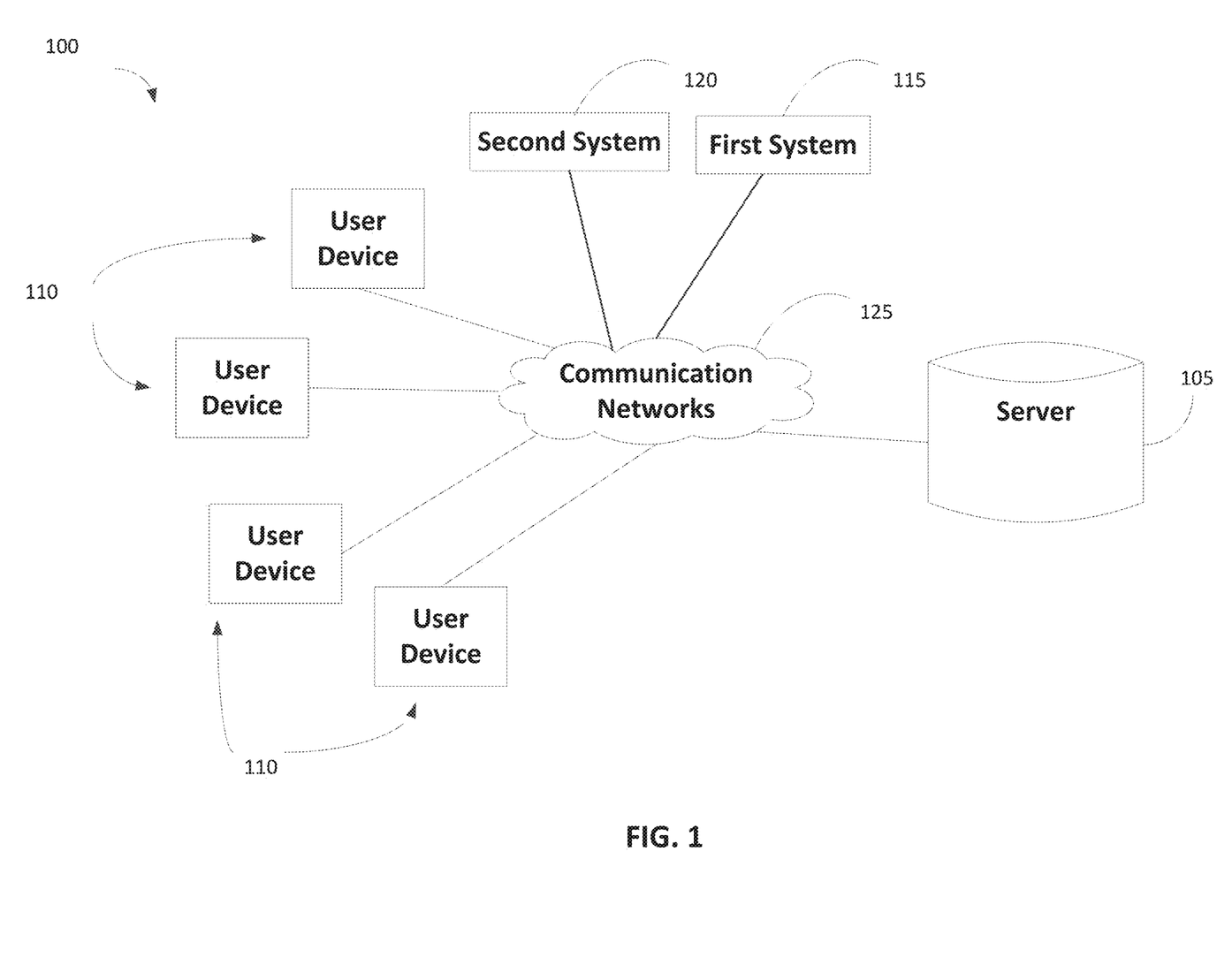
FIG. 1 is a block diagram of a system for generating a combined database.

FIG. 1 schematically illustrates a system 100 for generating a combined database according to one embodiment. As illustrated in FIG. 1, the system 100 includes a server 105, a plurality of user devices 110 (referred to herein collectively as "the plurality of user devices 110" and individually as "a user device 110"), and a plurality of source systems, such as for example, a first system 115 and a second system 120. The server 105, the first system 115, the second system 120, and the plurality of user devices 110 communicate over one or more wired or wireless communication networks 125. Portions of the wireless communication networks 125 may be implemented using a wide area network, such as the Internet, a local area network (such as an intranet established for a hospital or other facility), and combinations or derivatives thereof.

It should be understood that the server 105 may communicate with any number of source systems and the two source systems 115,120 illustrated in FIG. 1 are purely for illustrative purposes. For example, in some embodiments, as described in more detail below, the server 105 may communicate with one report-driven system (for example, a cardio reporting system) and up to fifteen database-driven systems (for example, hemodynamic systems). Also, in some embodiments, the server 105 may be combined with one or more of the source systems. Similarly, it should be understood that the server 105 may communicate with any number of user devices 110 and the four user devices 110 illustrated in FIG. 1 are purely for illustrative purposes. Also, in some embodiments, a user device 110 may communicate with the server 105 through one or more interim devices. Furthermore, although the first system 115 and the second system 120 are illustrated as each being included in a single server, in some embodiments, one or both of these systems 115, 120 are distributed on a plurality of servers.

Figure 2:
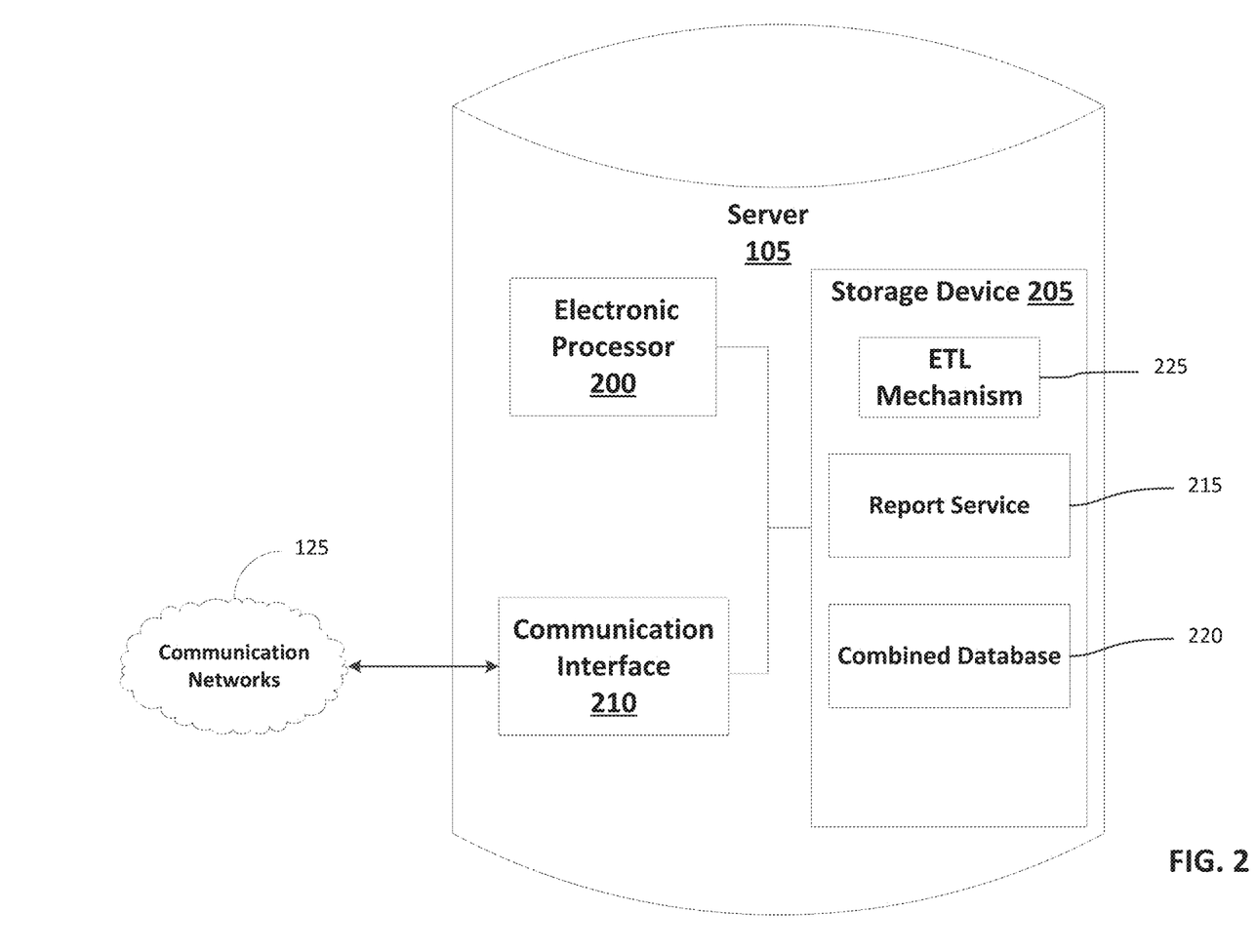
FIG. 2 is a block diagram of a server included in the system of FIG. 1.

As illustrated in FIG. 2, the server 105 is an electronic device that includes an electronic processor 200 (for example, a microprocessor, application-specific integrated circuit (ASIC), or another suitable electronic device), a storage device 205 (for example, a non-transitory, computer-readable storage medium), and a communication interface 210, such as a transceiver, for communicating over the communication networks 125 and, optionally, one or more additional communication networks or connections. The electronic processor 200, the storage device 205, and the communication interface 210 communicate over one or more communication lines or buses. It should be understood that the server 105 may include additional components than those illustrated in FIG. 2 in various configurations and may perform additional functionality than the functionality described in the present application. Also, the functionality described herein as being performed by the server 105 may be distributed among multiple devices, such as multiple servers operated within a cloud environment.

The electronic processor 200 included in the server 105 executes instructions stored in the storage device 205. In particular, as illustrated in FIG. 2, the storage device 205 stores a report service 215, a combined database 220, and an extract-transform-load (ETL) mechanism 225. The ETL mechanism 225 extracts data from the source systems. In some embodiments, the ETL mechanism 225 includes Structured Query Language (SQL) Server Integration Services (SSIS) for detecting and extracting changes from a source system and, optionally, performing data transformations on the extracted data. As described in more detail below, the report service 215 includes processing tasks that extract data from reports (markup language documents) extracted from one of the source systems and populates the combined database 220 with the extracted data.

It should be understood that the report service 215, ETL mechanism 225, and combined database 220 may be stored or distributed among multiple storage devices within the server 105 (or multiple servers) and the functionality described herein as being performed by the report service 215 and ETL mechanism 225 may be combined and distributed in various configurations. Additionally, the combined database 220 may be stored at locations other than the storage device 205. For example, the combined database 220 may be stored in a database the server 105 communicates with via the communication networks 125.

The ETL mechanism 225 (when executed by the electronic processor 200) is configured to communicate with the source systems (the first system 115 and the second system 120) to detect changes that have occurred in the first system 115 or the second system 120. The ETL mechanism 225 may also be configured to update the combined database 220 based on detected changes. For example, in some embodiments, the ETL mechanism 225 is configured to update the combined database 220 according to changes that occur in the first system 115, and the report service 215 may be configured to update the combined database 220 according to changes that occur in the second system 120. In some embodiments, the first system 115 is a hemodynamic system, such as Merge Hemo provided by Merge Healthcare, Inc., and the second system 120 may be a cardio reporting system, such as Merge Cardio provided by Merge Healthcare, Inc. However, it is should be understood that the functionality described herein may be used with other types of database-driven systems and report-driven systems. As used herein, a report-driven system is a system that stores data in a mark-up language document as compared to a database-driven system that stores data in one or more database tables.

Figure 3:
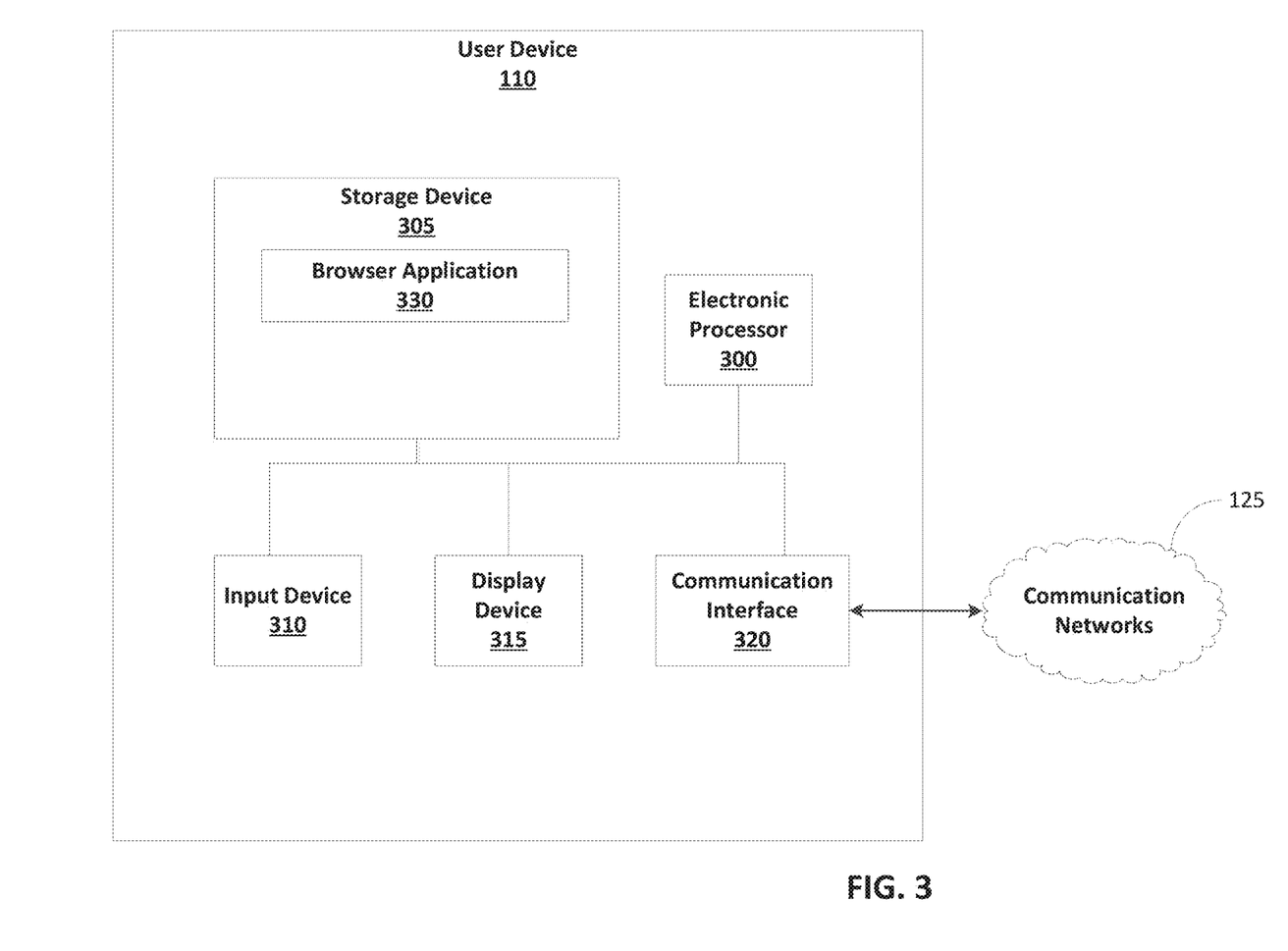
FIG. 3 is a block diagram of a user device included in the system of FIG. 1.

As illustrated in FIG. 3, the user device 110 is an electronic device, such as a terminal or workstation, a smart phone, a smart watch, a tablet computer, a laptop computer, virtual or mixed reality headsets, or the like, that includes an electronic processor 300 (for example, a microprocessor, application-specific integrated circuit (ASIC), or another suitable electronic device), a storage device 305 (for example, a non-transitory, computer-readable storage medium), an input device 310, a display device 315, and a communication interface 320 such as a transceiver, for communicating over the communication networks 125 and, optionally, one or more additional communication networks or connections. In some embodiments, the input device 310 is a touch screen, a keyboard, a mouse, a microphone, or the like. The display device 315 may be, for example, a touchscreen, a liquid crystal display (LCD), a light-emitting diode (LED) display, an organic LED (OLED) display, an electroluminescent display (ELD), and the like. The electronic processor 300, the storage device 305, the input device 310, the display device 315, and the communication interface 320 communicate over one or more communication lines or buses. It should be understood that a user device 110 may include additional components than those illustrated in FIG. 3 in various configurations and may perform additional functionality than the functionality described in the present application. Also, in some embodiments, the input device 310 and the display device 315 are combined in a single device or component, such as a touchscreen.

The storage device 305 of the user device 110 stores a browser application 330, which allows the user device 110 to communicate with the server 105 (or a separate web server associated with the server 105) and access a web-based portal to the combined database 220. The browser application 330 also displays user interfaces (UIs) generated by the server 105 and sent to the browser application 330 for display (as HTML code).

Figure 4:
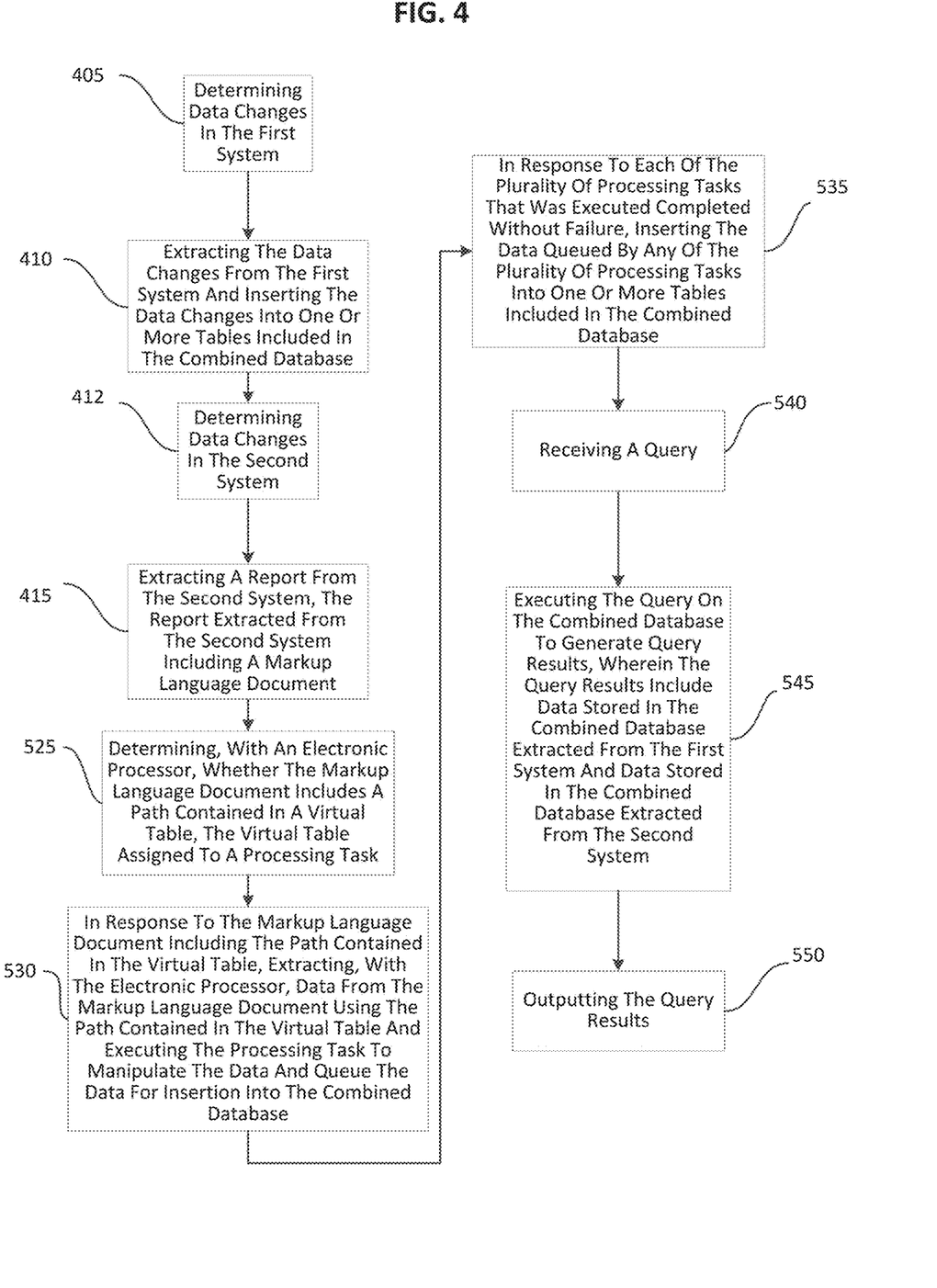
FIG. 4 is a flow chart illustrating a method of generating a combined database performed by the system of FIG. 1.

FIG. 4 illustrates a method 400 for generating a combined database performed by the system 100. The method 400 is described as being performed by the server 105 (the electronic processor 200 executing instructions, such as the ETL mechanism 225) to extract data from multiple source systems. For the purpose of simplicity, the method 400 is described as being performed to combine data extracted from the first system 115 and the second system 120 for storage in the combined database 220. However, as noted above, the functionality described herein can be used to extract and combine data from more than just two source systems.

As illustrated in FIG. 4, the method 400 includes determining, with the electronic processor 200, updates or changes to data stored in the first system 115 (at block 405). In particular, the ETL mechanism 225 (such as SSIS) queries change tracking information regarding the tables of the first system 115. In response to changes being detected, the ETL mechanism 225 extracts the data changes from the first system 115 and inserts the data changes into one or more tables included in the combined database 220 (at block 410). If the data changes extracted from the first system 115 have a different format than the data in the combined database 220, the ETL mechanism 225 may be configured to manipulate the extracted data to match the data format of the combined database 220. For example, if gender is represented as an integer (male and female are 1 and 0 respectively) in the first system 115 but is represented as a string ("male" and "female") in the combined database 220, the ETL mechanism 225 may convert data changes in the first system 115 involving gender from integers to strings.

The electronic processor 200 also determines updates or changes to data included in the second system 120 using the ETL mechanism 225 (at block 412). As noted above, in some embodiments, the second system 120 is a report-driving system and, thus, maintains a table of reports (a report table). Thus, the ETL mechanism 225 (SSIS) determines if a row in the report table is modified to determine if reports stored in the second system 120 have changed. In response to detecting changes in the second system 120, the ETL mechanism 225 (SSIS) extracts each report including data changes from the second system 120 and stores the extracted reports in a staging table (at block 415). An extracted report may include a markup language document, such as an eXtensible Markup Language (XML) document.

Since the reports extracted from the second system 120 include data stored in a markup language, such as XML, the reports must be processed to extract data from the reports and insert the data into the combined database 220. The report service 215 monitors the staging table and when the electronic processor 200 detects a report in the staging table, the report service 215 loads the report into the storage device 205. To process extracted reports, the report service 215, as described in more detail below, uses a plurality of processing tasks that each process an extracted report and insert data into the appropriate tables of the combined database 220. The processing tasks allow more granular control over how report data (markup language data) is transformed and may lower the performance requirements of the server 105.

Figure 5:
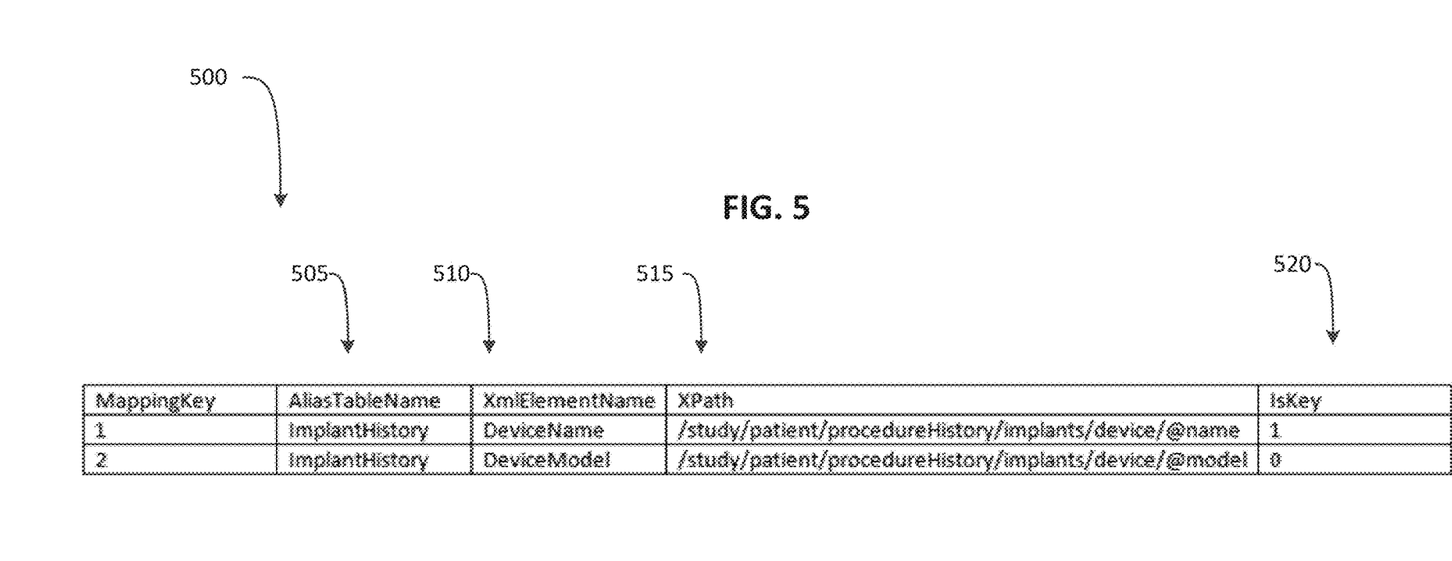
FIG. 5 illustrates is an example of a virtual table created as part of the method of FIG. 4.

Each processing task is assigned one or more virtual tables containing a plurality of paths, such as x-paths, to use to process a markup language document. A shared mapping table defines each virtual table assigned to each processing task. For example, the table 500 illustrated in FIG. 5 illustrates a portion of an example shared mapping table defining virtual tables. The report service 215 may generate a thread for each virtual table contained in the mapping table. Each thread parses the markup language document and generates an in-memory table based on the markup language document and the virtual table associated with the thread. Each virtual table is defined by a column 505 of the table 500. In FIG. 5, a virtual table "Patient Treatment History" is defined as one example. The columns of data to be contained in the in-memory table are defined in column 510, titled "XmlElementName." For example, the in-memory table created based on the table of FIG. 5 includes the columns "Device Name" and "Device Model." The data to be contained in each column of the in-memory table is located in the markup language document at locations defined by the paths (x-paths) in column 515, titled "XPath." Column 520, titled "IsKey," defines the number of rows of data contained in the in-memory table as the number of times an x-path marked with a 1 in column 520 occurs in the markup language document. For example, the in-memory table created from the table 500 in FIG. 5 will have as many rows as there are occurrences of the x-path "/study/patient/procedureHistory/implants/device/@name" because this x-path has a 1 placed in the column 520. Assigning virtual tables containing groups of x-paths to a plurality of processing tasks allows an engineer or administrator to more easily debug issues and improves performance time (by only executing paths as needed based on the extracted report). Assigning virtual tables containing groups of x-paths to a plurality of processing tasks also allows the processing of the markup language report to be easily distributed among multiple processors, cores, or threads.

The electronic processor 200, using the report service 215, determines whether the markup language document includes at least one path in the virtual table assigned to a particular processing task (at block 525). If the markup language document includes at least one path in the virtual table assigned to the processing task, the processing task extracts data from the markup language document using the path in the virtual table. For example, if there is at least one occurrence of a path in the document then there is data for the processing task to process. The processing task manipulates the extracted data so the extracted data is in the same format as data in the combined database 220, optionally links the extracted data to data elements already stored in the combined database 220, and queues the data into an in-memory table associated with the virtual table for insertion into the combined database 220 (at block 530). In some embodiments, the processing task also decides that the data should not be inserted into the combined database 220 if, for example, the combined database 220 already contains the data.

In response to every processing task involved in processing an extracted report completing without failure, the electronic processor 200 (executing the report service 215) inserts the queued data into the combined database 220 (at block 535). However, if one or more processing tasks fail, the extracted report is marked as failed and the data queued by any of the plurality of processing tasks is discarded without being added to the one or more tables included in the combined database 220 (for example, to prevent an incomplete addition of data to the combined database 220).

As described in further detail below, the electronic processor 200 is also configured to receive a query from a user via a user interface (at block 540). The electronic processor 200 executes the query on the combined database 220 to generate query results that include data extracted from the combined database 220, wherein, in some embodiments, the data extracted from the combined database 220 includes data originally extracted from first system 115 and data originally extracted from the second system 120 (at block 545). The electronic processor 200 then outputs the query results (at block 550). The query results are output in a format specified by the user, for example, a table format, a pie chart format, and the like. As noted above, providing combined query results aids a user in analyzing data and results in more efficient use of computer resources.

Figure 6:
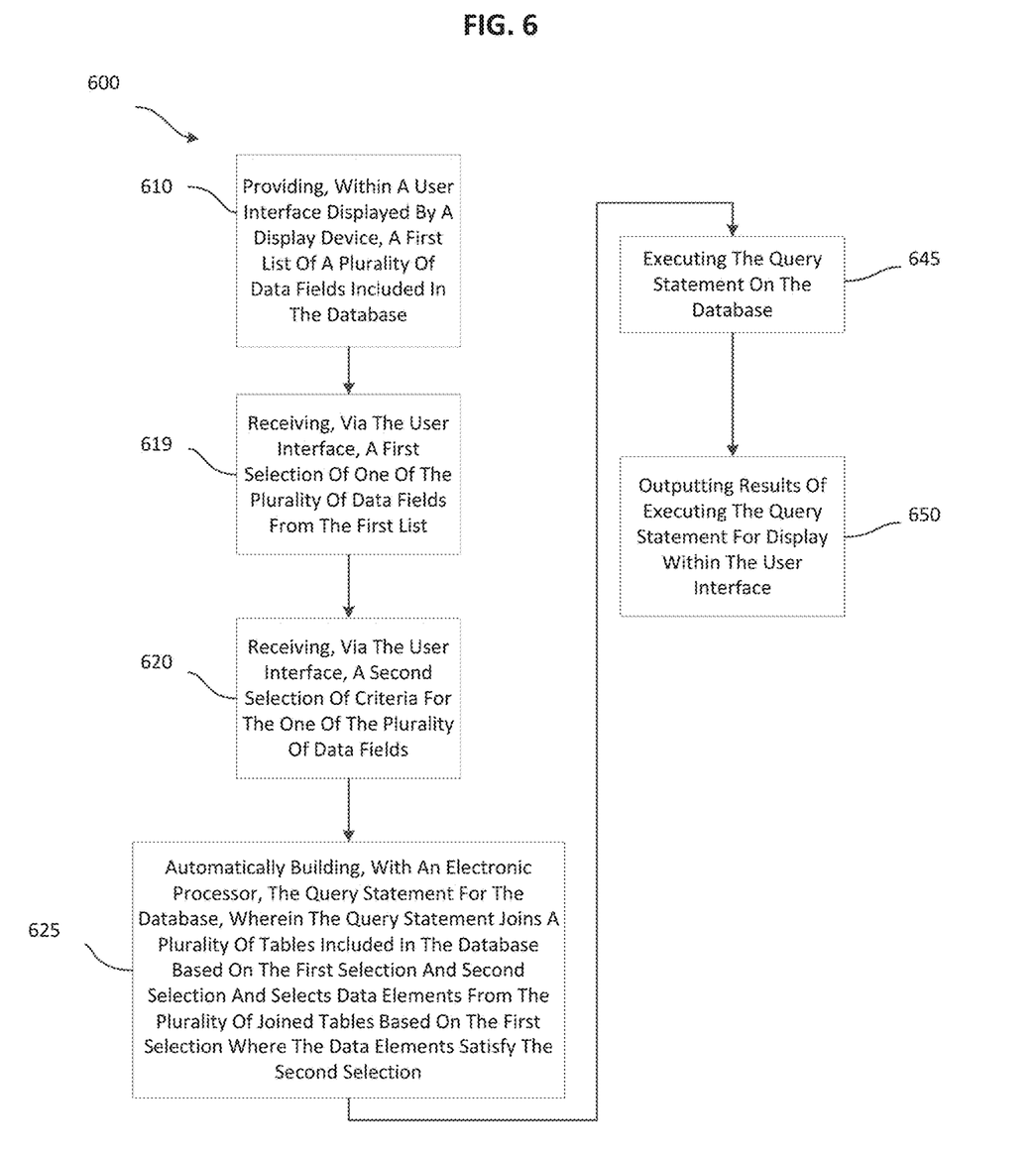
FIG. 6 is a flow chart illustrating a method of automatically building a query statement for a database performed by the system of FIG. 1.

In some embodiments, the query of the combined database 220 is automatically built using user selections received through a user interface. Accordingly, a user is not required to know a specific database query language or a structure (tables, data elements, and the like) of the combined database 220 to generate an accurate query. For example, FIG. 6 is a flowchart illustrating a method 600 of automatically building a query statement for a database, specifically, the combined database 220. In some embodiments, the query statement is written (built) in SQL. However, other query languages could also be used. The method 600 is described as being performed by the server 105 (the electronic processor 200) interacting with a user device 110 through the browser application 330. For example, the browser application 330 communicates with the sever 105 (or a separate web server associated with the server 105 or the combined database 220) to receive data to display to a user, such as user interfaces defined using HTML code, and provides input received from a user in response to the displayed data back to the server 105. Also, although the method 600 is described with respect to the combined database 220, the method 600 may be used with any type of databases or sets of databases.

Figure 7:
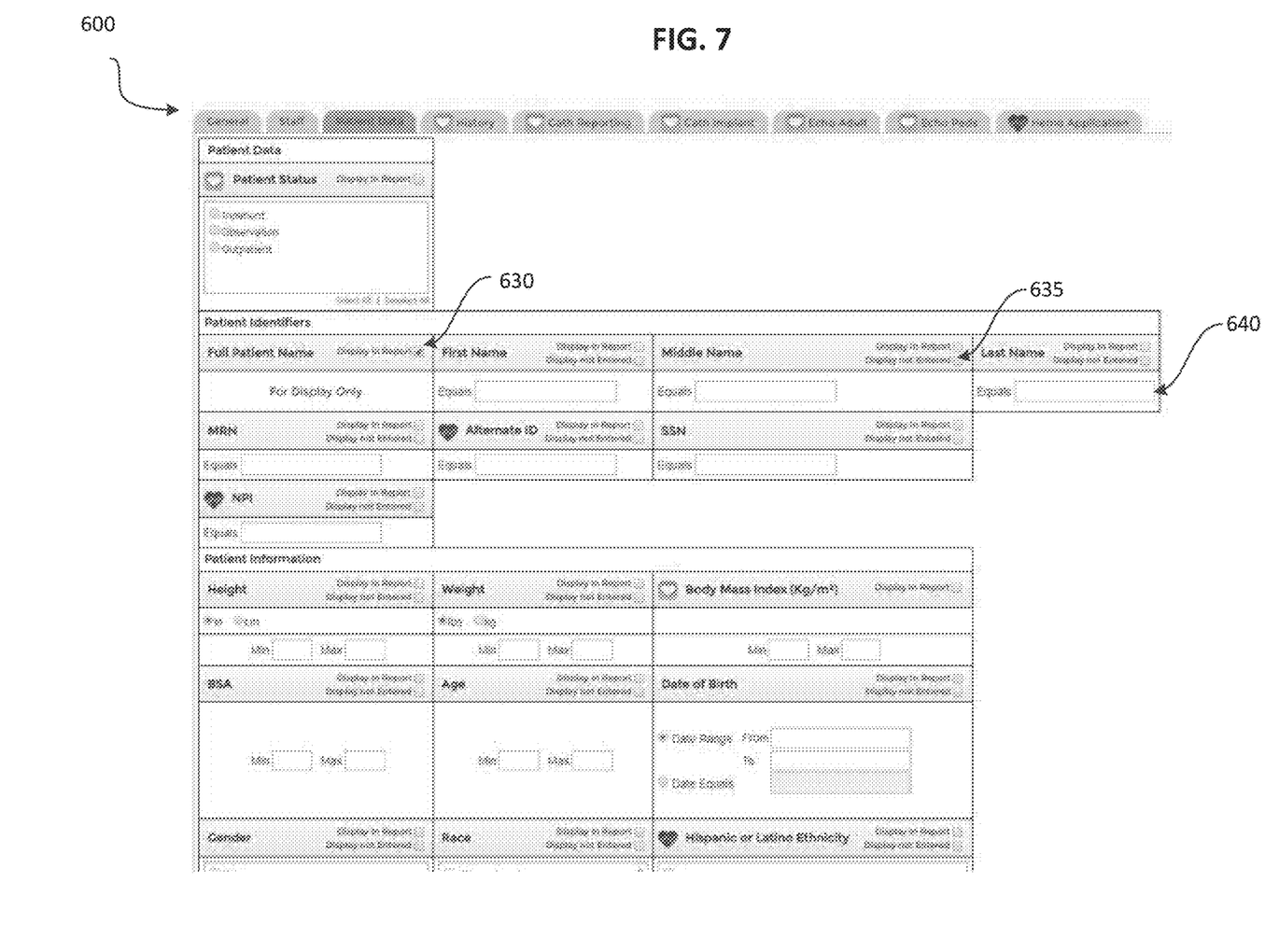
FIG. 7 illustrates a user interface for building a database query.
Figure 8A:
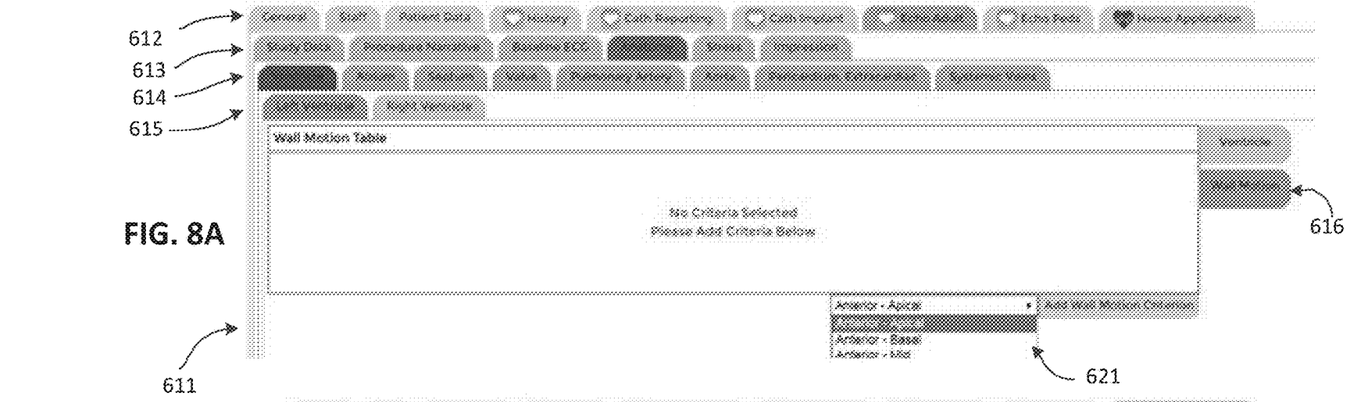
FIG. 8A and FIG. 8B illustrate a plurality of tabs in a user interface for building a database query.

For example, the browser application 330 may display a user interface, such as the user interface 605 illustrated in FIG. 7, via the display device 315 of the user device 110. As illustrated in FIG. 7, the user interface 605 includes a first list of a plurality of data fields included in the database and criteria for each of the plurality of data fields included in the first list (at block 610). The data fields are divided and positioned amongst a plurality of tabs of the user interface 605, which allows a user to more easily find the data fields and criteria that the user wants to select. Each tab of the plurality of tabs represents a type of data fields contained within the database. An example user interface containing a plurality of tabs 611 is illustrated in FIG. 8A. The tabs in the user interface may be organized into levels based on the type of data fields and criteria that the tabs contain. The first list provided by the user interface may be one of a plurality of available first lists and may be automatically selected based on the tab the user selects (the selected tab). Also, depending on the tab the user selects (the selected tab), a next level of tabs may be dynamically displayed in the user interface. The next level of tabs includes tabs representing types of data fields that are included in the type of data fields represented by the selected tab but are more specific or narrower than the type of data field represented by the selected tab.

As illustrated in FIG. 8A, the plurality of tabs may be organized into five levels (four horizontal levels and one vertical level). A first level 612 includes a plurality of tabs relating to general data, such as, for example, patient data, staff data, and reports. If a user selects a tab titled "Echo Adult" included in the first level 612, a second level 613 of tabs is displayed in the user interface. Tabs in the second level 613 relate to study data, such as, for example, procedure narrative data and anatomy data. If the user selects a tab titled "Anatomy" in the second level 613, a third level 614 of tabs is displayed in the user interface. The third level 614 includes a plurality of tabs relating to the general anatomy of the heart. If a user selects a tab titled "Ventricle" in the third level 614 of tabs, the user interface displays a fourth level 615 of tabs. Tabs in the fourth level 615 may relate to more specific parts of the heart than the tabs in the third level 614. Thus, a user can use the various levels of tabs to drill down and locate particular data fields that the user may be interested in.

Figure 8B:
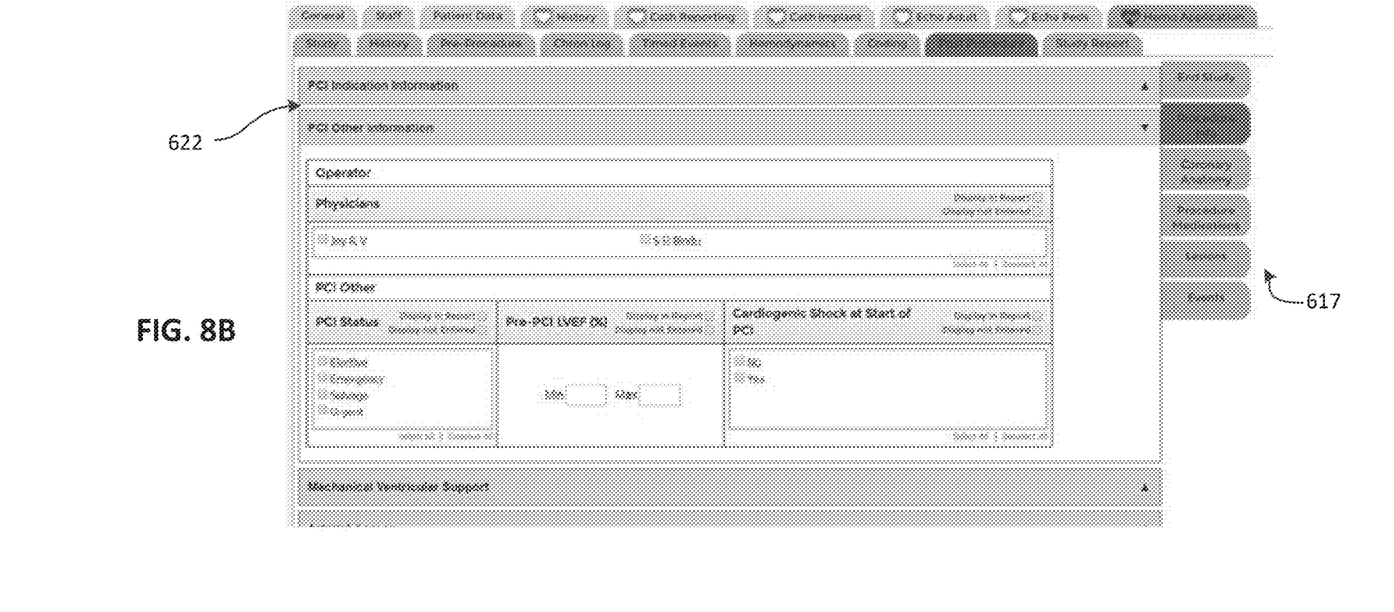

Selecting one of the tabs in one of the horizontal levels may also cause a vertical level of tabs to be displayed, such as vertical levels 616 and 617 in FIG. 8A and FIG. 8B. Selecting one of the tabs in one of the horizontal levels may also cause a drop down menu, such as drop down menu 621 in FIG. 8A, to appear. The user's selection of a plurality of options in the drop down menu is used by the electronic processor 200 to determine the first list to display (provide) from the plurality of available first lists. Selecting one of the tabs in one of the horizontal levels may also cause one or more collapsible menus, such as those illustrated in FIG. 8B, to be displayed in the user interface. The user's selection (expansion) of a collapsible menu, such as collapsible menu 622, is used by the electronic processor 200 to determine the first list to display (provide) from the plurality of available first lists.

The electronic processor 200 receives, via the user interface, a first selection of one of the plurality of data fields from the first list (at block 619) and receives, via the user interface, a second selection of a criterion for one of the plurality of data fields (at block 620). The first selection determines the data fields that will be displayed in results obtained by executing a query statement. For example, the user may select, as a first selection, the data field "Full Patient Name" by checking the box next to the display in report option for the data field "Full Patient Name." The second selection determines the criterion that will be used to filter the data in the combined database 220 to generate the results. The user selects the criterion by, for example, checking a check box in a list of check boxes, selecting minimum and maximum values, entering a string of characters the criterion should be equal to, and or selecting a range of dates. The second selection of the criterion may be, for example, the user specifying a minimum and maximum weight by entering a minimum and maximum weight in the data field "Weight."

In response to receiving the first selection and the second selection, the electronic processor 200 automatically builds a query statement for querying the database (at block 625). The query statement is built based on the configuration of the database (the combined database 220). The query statement may contain a plurality of join statements to join a plurality of tables in the database based on the first selection and the second selection. For example, in some embodiments, the combined database is organized based on a star schema and tables may need to be joined to map particular unique keys to particular display values. The query statement selects data elements that satisfy the second selection from the plurality of joined tables based on the first selection. In some embodiments, the first selection of one of the plurality of data fields creates a select data field statement in the query statement or a select where data field does not exist statement for inclusion in the query statement. For example, if a user selects a checkbox 630 associated with "Display in Report" in the data field "Full Patient Name," the electronic processor 200 creates a query statement containing the select data field statement "SELECT FullPatientName." In another example, if a user selects a checkbox 635 associated with "Display Not Entered" in the data field "Middle Name," the electronic processor 200 creates a query statement containing the select where data field does not exist statement "WHERE MiddleName IS NULL."

In some embodiments, the second selection creates a where statement in the query statement. For example, if a user enters "Smith" into textbox 640 in FIG. 6, the electronic processor 200 generates a where statement (for example, WHERE LastName IN ('Smith')). In some embodiments, if multiple criteria (a set of criteria) are selected, the electronic processor 200 automatically inserts a linking statement, such as an AND statement, between each pair of sequential where statements. In other embodiments, if multiple criteria are selected, the electronic processor 200 concatenates or links the where statements created for each criterion with a linking statement such as the AND statement or an OR statement.

Figure 9:
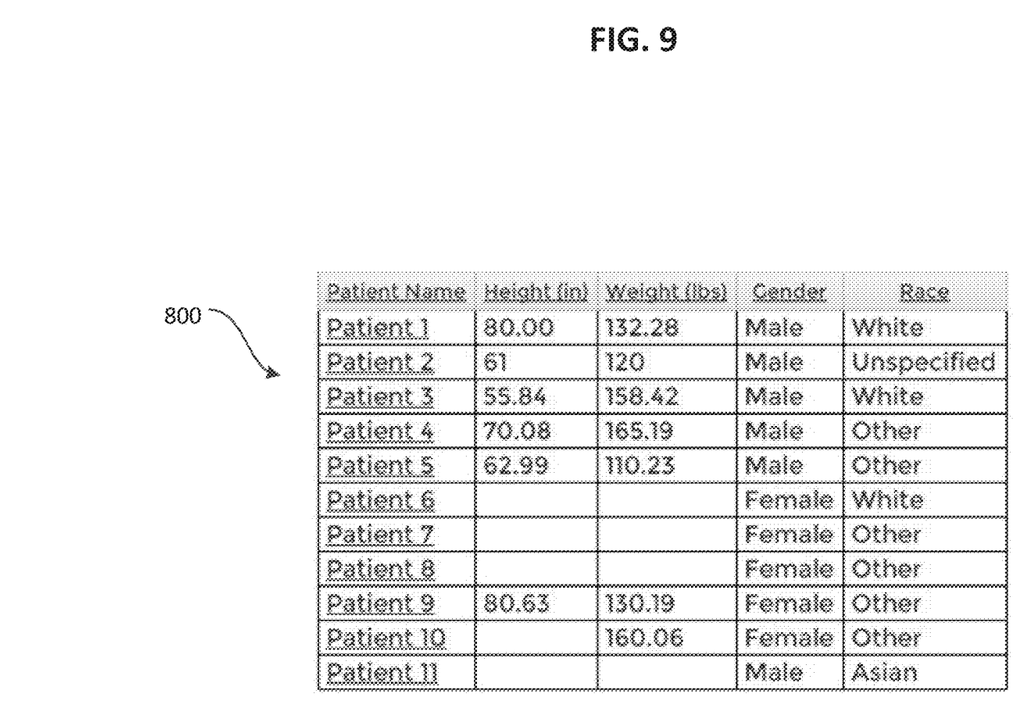
FIG. 9 illustrates a table generated in response to a query statement.

After the electronic processor 200 builds the query statement, the electronic processor 200 automatically executes the query statement on the database (for example, the combined database 220) (at block 645). The electronic processor 200 receives from the database the results of executing the query statement and displays (returns) the results of executing the query statement, such as via the display device 315 of the user device 110 (at block 650). In some embodiments, the results of executing the query statement are displayed in the form of a table, such as the example table 800 illustrated in FIG. 9. The columns displayed in the table 800 are chosen based on the data fields for which the checkbox associated with "Display in Report" was checked (the first selection). For example, in the table 800, the data fields height, weight, race, and gender were selected by checking the checkbox associated with "Display in Report," to be displayed in the table.

Figure 10:
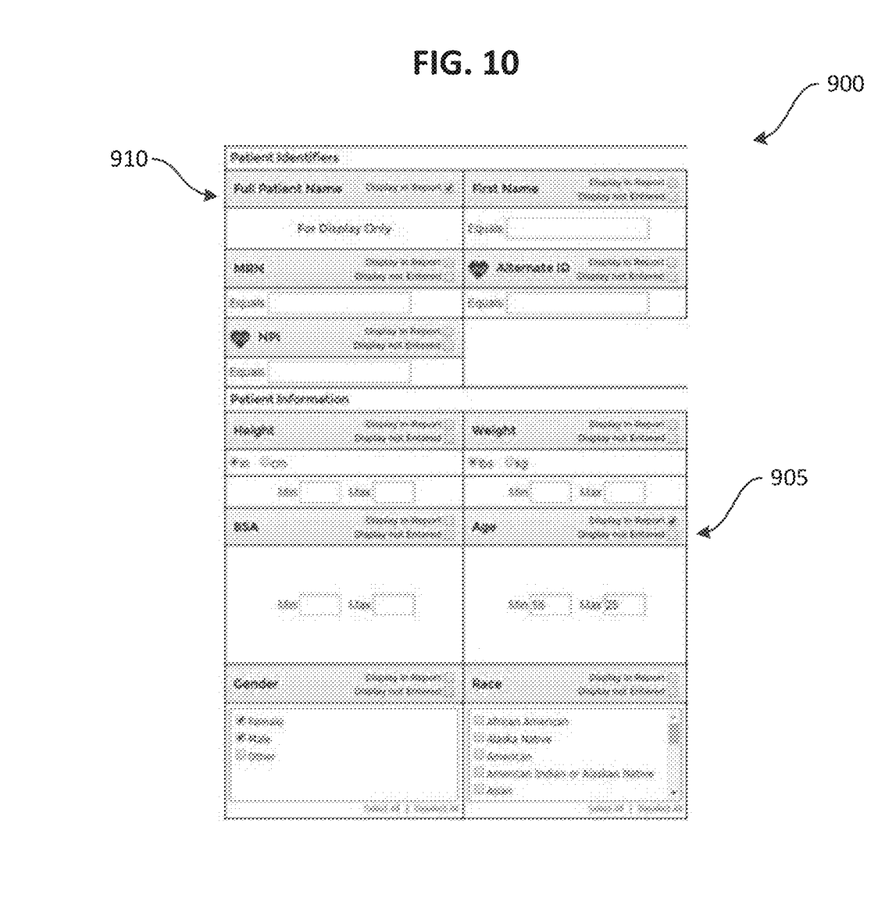
FIG. 10 illustrates selections of data fields and criteria for a database query.

FIG. 10 provides another example of a user interface 900 including selections of data fields to display in the report and criteria for data elements. In particular, as illustrated in FIG. 10, a user has selected a data field age 905 and a data field full patient name 910 to be displayed as part of the query results. As also illustrated in FIG. 10, the user has selected criteria for the selected data fields to include ages between eighteen and twenty five and include genders of male or female. FIG. 11 illustrates the query statement generated by the electronic processor 200 based on the selections made in the user interface 900 illustrated in FIG. 10.

Various features and advantages of some embodiments are set forth in the following claims.

What is claimed is:

1. A system for automatically building a query statement for a database, the system comprising:
   an electronic processor configured to
   provide a user interface displayed by a display device, the user interface including a plurality of tabs, wherein each tab of the plurality of tabs represents a type of data field included in the database and the plurality of tabs are organized into one or more of levels of tabs;
   receive a selection of a first tab of the plurality of tabs;
   in response to receiving the selection of the first tab, add a second level of tabs within the user interface based on the first selected tab, wherein each tab included in the second level of tabs represents specific type of data field within a type of data field represented by the first tab;
   receive a selection of a second tab of the second level of tabs;
   in response to receiving the selection of the second tab, add a drop down menu to the user interface based on the second tab, wherein the drop down menu comprises a plurality of options;
   receive a selection of an option of the plurality of options of the drop down menu;
   provide, within the user interface, a first list of a plurality of data fields included in the database, wherein the first list is one of a plurality of available lists, and the first list is selected from the plurality of available lists based on the first tab, the second tab, and the option;
   receive, via the user interface, a first selection of one of the plurality of data fields from the first list;
   receive, via the user interface, a second selection of a criterion for one of the plurality of data fields from the first list;
   automatically build the query statement for the database, wherein the query statement includes a plurality of join statements to join a plurality of tables included in the database based on the first selection and second selection so as to map particular unique keys to particular display values, and selects data elements from the plurality of joined tables based on the first selection where the data elements satisfy the second selection;
   execute the query statement on the database; and
   output results of executing the query statement for display within the user interface.

2. The system according to claim 1, wherein the electronic processor is configured to create a select data field statement or a select where data field does not exist statement for inclusion in the query statement based on the first selection.

3. The system according to claim 1, wherein the electronic processor is configured to create a where statement for inclusion in the query statement based on the second selection of the criterion.

4. The system according to claim 1, wherein the second selection of the criterion includes a set of criteria and wherein the electronic processor is further configured to automatically insert a linking statement in the query statement between each criterion within the set of criteria.

5. The system according to claim 1, wherein the first selection defines a column of data displayed in a table that includes the output results.

6. The system according to claim 1, wherein the database and the output results include data extracted from a hemodynamic system and a cardio reporting system.

7. A method of automatically building a query statement for a database, the method comprising:
providing a user interface displayed by a display device, the user interface including a plurality of tabs, wherein each tab of the plurality of tabs represents a type of data field included in the database and the plurality of tabs are organized into one or more of levels of tabs;
receiving a selection of a first tab of the plurality of tabs;
in response to receiving the selection of the first tab, adding a second level of tabs within the user interface based on the first tab, wherein each tab included in the next level of tabs represents specific type of data field within a type of data field represented by the first tab;
receiving a selection of a second tab of the second level of tabs;
in response to receiving the selection of the second tab, adding a drop down menu to the user interface based on the second tab, wherein the drop down menu comprises a plurality of options;
receiving a selection of an option of the plurality of options of the drop down menu;
providing, within the user interface, a first list of a plurality of data fields included in the database, wherein the first list is one of a plurality of available lists, and the first list is selected from the plurality of available lists based on the first tab, the second tab, and the option;
receiving, via the user interface, a first selection of one of the plurality of data fields from the first list;
receiving, via the user interface, a second selection of a criterion for one of the plurality of data fields;
automatically building, with an electronic processor, the query statement for the database, wherein the query statement includes a plurality of join statements to join a plurality of tables included in the database based on the first selection and second selection so as to map particular unique keys to particular display values, and selects data elements from the plurality of joined tables based on the first selection where the data elements satisfy the second selection;
executing the query statement on the database; and
outputting results of executing the query statement for display within the user interface.

8. The method according to claim 7, wherein automatically building the query statement for the database includes creating a select data field statement or a select where data field does not exist statement for inclusion in the query statement based on the first selection.

9. The method according to claim 7, wherein automatically building the query statement for the database includes creating a where statement for inclusion in the query statement based on the second selection of the criterion.

10. The method according to claim 7, wherein receiving a second selection of a criterion includes receiving a set of criteria and wherein building the query statement includes automatically inserting a linking statement between each criterion within the set of criteria.

11. The method according to claim 7, further comprising displaying the results of executing the query statement in the user interface as a table wherein the first selection defines a column of data displayed in the table.

12. The method according to claim 7, wherein automatically executing the query statement on the database includes automatically executing the query statement on a combined database.

* * * * *